(12) United States Patent
Kajiki et al.

(10) Patent No.: US 7,085,424 B2
(45) Date of Patent: *Aug. 1, 2006

(54) METHOD AND SYSTEM FOR COMPRESSING MOTION IMAGE INFORMATION

(75) Inventors: Noriko Kajiki, Tokyo (JP); Satoshi Tanabe, Tokyo (JP)

(73) Assignee: Kobushiki Kaisha Office Noa, Tokyo (JP)

( * ) Notice: Subject to any disclaimer, the term of this patent is extended or adjusted under 35 U.S.C. 154(b) by 229 days.

This patent is subject to a terminal disclaimer.

(21) Appl. No.: 10/626,528

(22) Filed: Jul. 25, 2003

(65) Prior Publication Data

US 2004/0247192 A1 Dec. 9, 2004

Related U.S. Application Data

(63) Continuation-in-part of application No. 09/750,118, filed on Dec. 29, 2000, and a continuation of application No. PCT/JP02/00713, filed on Jan. 30, 2002.

(30) Foreign Application Priority Data

| | | |
|---|---|---|
| Jun. 6, 2000 | (JP) | 2000-169680 |
| Jul. 19, 2000 | (JP) | 2000-218397 |
| Nov. 1, 2000 | (JP) | 2000-334440 |
| Jan. 30, 2001 | (EP) | 01102046 |
| Nov. 1, 2001 | (JP) | 2001-337217 |

(51) Int. Cl.
*G06K 9/46* (2006.01)

(52) U.S. Cl. .................... 382/239; 382/236; 348/404.1

(58) Field of Classification Search .............. 382/239, 382/232, 236, 246, 265; 341/51; 348/404.1, 348/419.1, 404.7, 407.1; 358/426.02, 426.11, 358/426.06; 704/270.1

See application file for complete search history.

(56) References Cited

U.S. PATENT DOCUMENTS

| 3,497,801 A | 2/1970 | Clower |
| 4,205,309 A | 5/1980 | Music |
| 4,734,784 A * | 3/1988 | Tanaka ...................... 358/2.1 |

(Continued)

FOREIGN PATENT DOCUMENTS

EP 0 339 938 B1 4/1989

(Continued)

OTHER PUBLICATIONS

European Search Report Dated Sep. 9, 2003.

(Continued)

*Primary Examiner*—Barry Choobin
(74) *Attorney, Agent, or Firm*—Rader, Fishman & Grauer PLLC

(57) ABSTRACT

A method and system for compressing motion image information, which can compress data that can be subjected to predictive encoding. An image within a frame is divided into blocks before an inter-frame compression procedure begins, and each block is approximated with a single plane represented by at least three components for pixels within each block. Pixels between the original image and the image expanded after compressed can be compared, and when a pixel that causes greater difference than a given parameter to occur exists, intra-frame compression is performed using a smaller block size. Furthermore, when the respective I blocks, which are spatially divided, are dispersed between each frame along the temporal axis, no I block is inserted into any block within the frame that has been updated due to difference between frames being greater than parameter P during a designated period of time.

42 Claims, 11 Drawing Sheets

U.S. PATENT DOCUMENTS

| | | | |
|---|---|---|---|
| 4,816,901 A | 3/1989 | Music | |
| 4,827,338 A | 5/1989 | Gerard | |
| 4,831,659 A * | 5/1989 | Miyaoka et al. | 382/240 |
| 4,843,466 A | 6/1989 | Music | |
| 4,847,677 A | 7/1989 | Music | |
| 4,849,807 A | 7/1989 | Music | |
| 4,857,991 A | 8/1989 | Music | |
| 4,857,993 A | 8/1989 | Music | |
| 4,914,508 A | 4/1990 | Music | |
| 5,046,071 A | 9/1991 | Tanoi | |
| 5,164,819 A | 11/1992 | Music | |
| 5,177,608 A | 1/1993 | Ohki et al. | |
| 5,193,001 A | 3/1993 | Kerdranvrat | |
| 5,315,670 A | 5/1994 | Shapiro | |
| 5,321,776 A | 6/1994 | Shapiro | |
| 5,367,385 A * | 11/1994 | Yuan | 358/465 |
| 5,448,296 A | 9/1995 | Music | |
| 5,467,409 A * | 11/1995 | Yamamoto | 382/285 |
| 5,485,213 A | 1/1996 | Murashita | |
| 5,739,861 A | 4/1998 | Music | |
| 5,740,278 A | 4/1998 | Berger | |
| 5,812,787 A | 9/1998 | Astle | |
| 5,864,678 A | 1/1999 | Riddle | |
| 5,870,754 A * | 2/1999 | Dimitrova et al. | 707/104.1 |
| 5,909,252 A * | 6/1999 | Ueda et al. | 375/240.12 |
| 5,912,991 A * | 6/1999 | Jeon et al. | 382/242 |
| 6,018,366 A * | 1/2000 | Asai et al. | 375/240.18 |
| 6,028,967 A * | 2/2000 | Kim et al. | 382/268 |
| 6,061,474 A | 5/2000 | Kajiwara et al. | |
| 6,151,409 A * | 11/2000 | Chen et al. | 382/166 |
| 6,201,896 B1 * | 3/2001 | Ishikawa | 382/236 |
| 6,233,008 B1 * | 5/2001 | Chun | 348/170 |
| 6,260,171 B1 * | 7/2001 | Gray | 714/771 |
| 6,408,109 B1 | 6/2002 | Silver | |

FOREIGN PATENT DOCUMENTS

| | | |
|---|---|---|
| EP | 0 339 947 B1 | 4/1989 |
| EP | 0 339 948 B1 | 4/1989 |
| EP | 0 343 790 B1 | 4/1989 |
| EP | 0 330 455 A2 | 8/1989 |
| EP | 0 527 245 | 8/1991 |
| EP | 0 476 603 A2 | 9/1991 |
| EP | 0 750 428 A2 | 6/1996 |
| EP | 0 734 167 A2 | 9/1996 |
| JP | 62-101183 | 5/1987 |
| JP | 62-120791 | 6/1987 |
| JP | 04-129491 | 4/1992 |
| JP | 05-064015 | 3/1993 |
| JP | 05-227547 A | 9/1993 |
| JP | 06-237455 A1 | 8/1994 |
| JP | 09-009265 | 1/1997 |
| JP | 09-037246 A1 | 2/1997 |
| JP | 10-098620 | 4/1998 |
| JP | 11-164305 | 6/1999 |
| JP | 11-289542 | 10/1999 |
| JP | 2000-165873 A1 | 6/2000 |
| JP | 3441736 B | 9/2003 |
| KR | 1998-57214 | 9/1998 |
| WO | WO-89-10673 A | 11/1989 |
| WO | WO-89-10674 A | 11/1989 |
| WO | WO-89-10675 A | 11/1989 |
| WO | WO-97-42760 A | 11/1997 |

OTHER PUBLICATIONS

D. Salomon, "Data Compression: The Complete Reference," pp. 61-69, Paragraph 2.11 entitled "MNP7," Springer (1998).

Ling et al., "Dimensional Adaptive Arithmetic Coding for Image Compression," Circuits and Systems, ISCAS '98, Proceedings of the 1998 IEEE International Symposium, pp. 13-16, IEEE (1998).

European Search Report Dated Jun. 16, 2004.

Peter Strobach, "Quadtree-Structured Recursive Plane Decomposition Coding of Images," IEEE Transaction of Acoustics, Speech and Signal Processing, vol. 39, No. 6, IEEE (Jun. 1991).

Wang et al., "Fuzzy Reasoning for Image Compression Using Adaptive Triangular Plane Patches," Fuzzy Sets and Systems, vol. 103, No. 2, pp. 277-284, Elsevier B.V. (1999).

Yamasaki et al., "Data Compression of Digital Images with Grey Level Using Triangular Plane Patches," Systems and Computers in Japan, vol. 24, No. 10, pp. 51-61, Scipta Technica, Inc. (1993).

Eden et al., "Polynomial Representation of Pictures," Signal Processing, vol. 10, No. 4, pp. 385-393, Elsevier Science Publishers B.V. (1986).

Xue et al., "High Compression Vector Quantization Scheme for Image Coding," Electronics Letters, vol. 29, No. 10, pp. 839-841 (May 13, 1993).

Goldberg et al., "Image Sequence Coding Using Vector Quantization," vol. COM-34, No. 7, pp. 703-710, IEEE (Jul. 1986).

* cited by examiner (A) Frame t (B) Frame t + 1

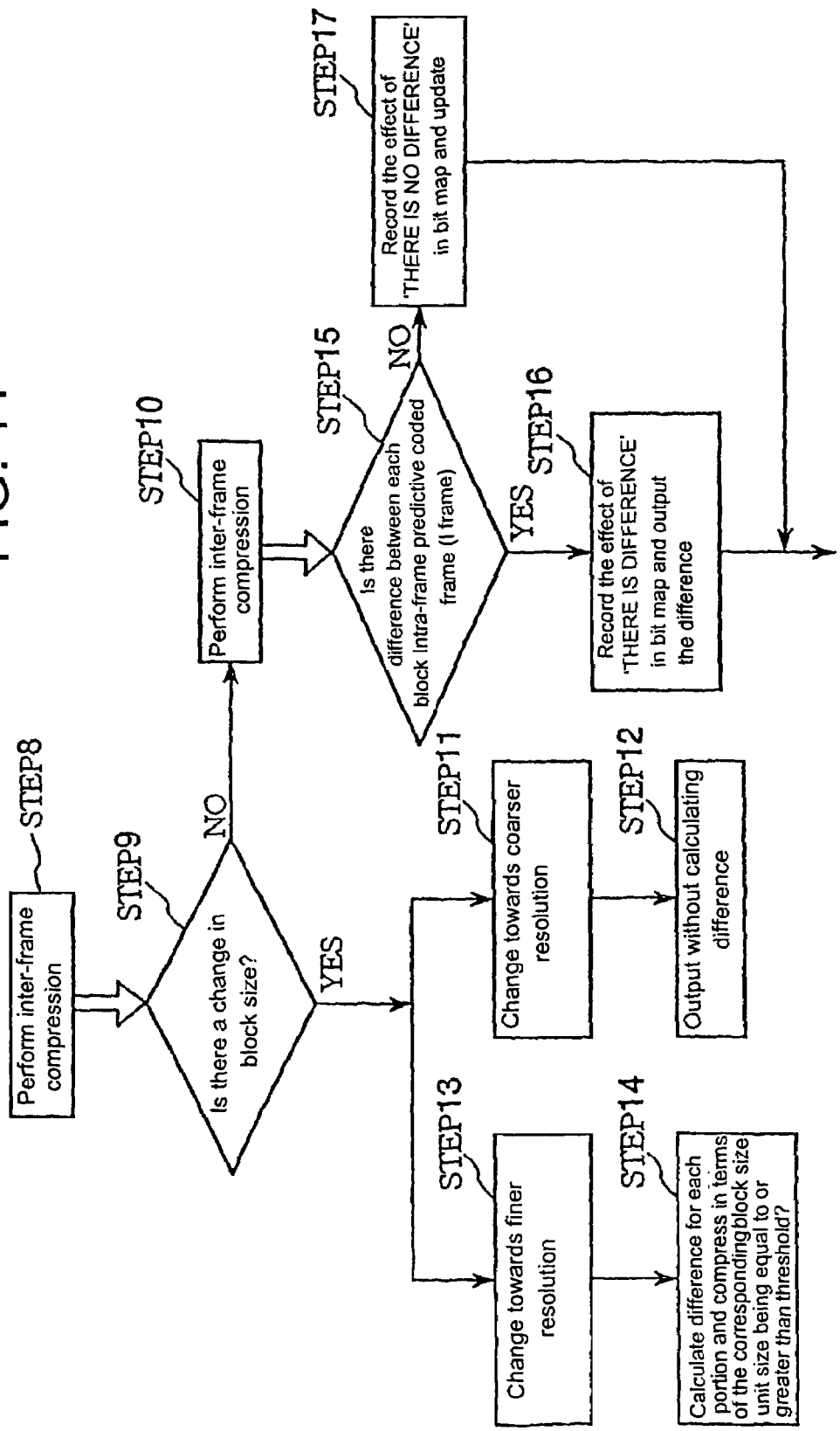

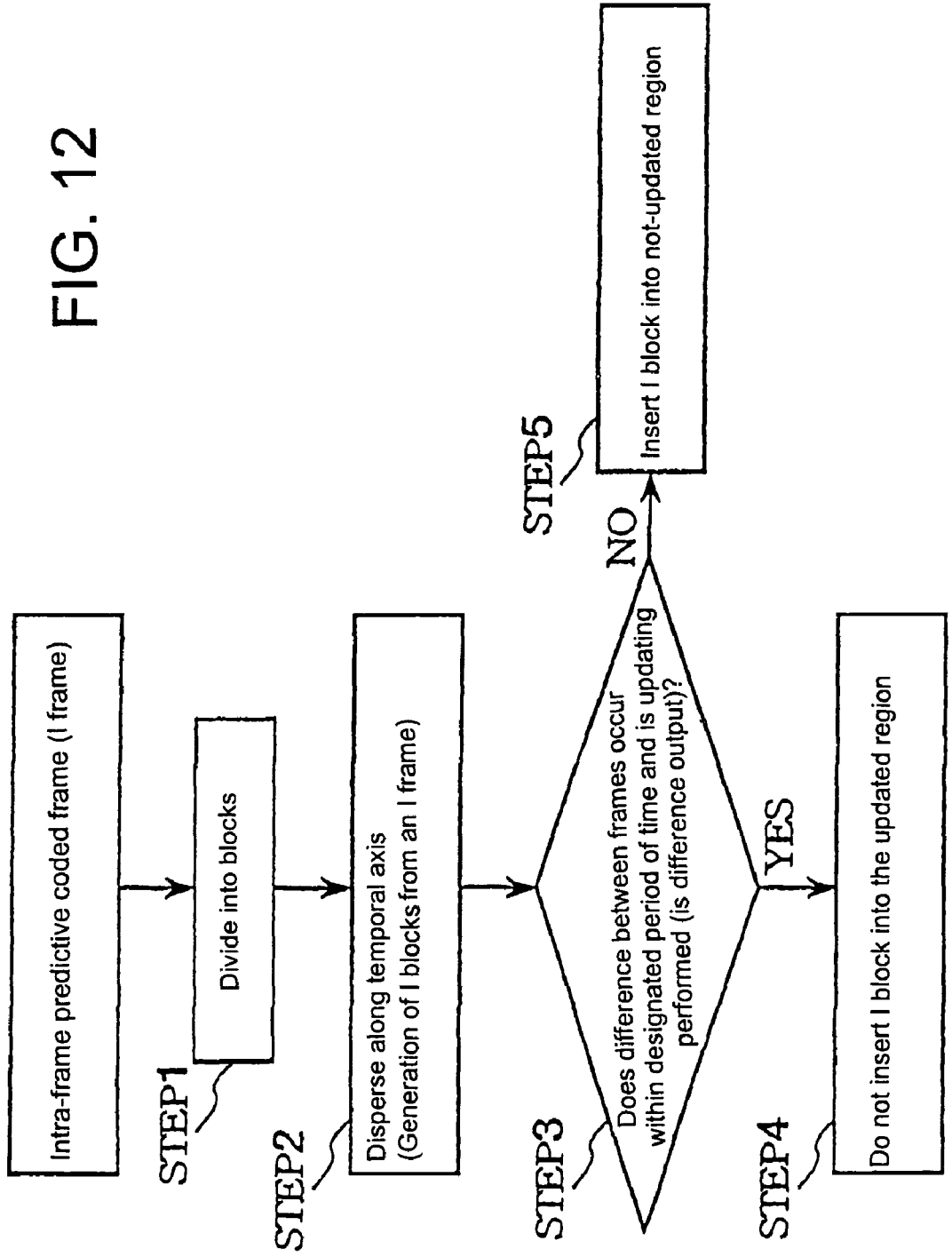

METHOD AND SYSTEM FOR COMPRESSING MOTION IMAGE INFORMATION

This is a continuation-in-part of application Ser. No. 09/750,118, filed Dec. 29, 2000 and at the same time, a continuation of copending International Application PCT/JP02/00713, filed Jan. 30, 2002, which designated the United States. The International Application was not published in English under PCT Article 21(2).

TECHNICAL FIELD OF THE INVENTION

The present invention relates to a method and system for compressing motion image information, which can compress, with a high compression ratio and at a high speed, data or image information that can be subjected to predictive coding, and which can improve image quality.

DESCRIPTION OF RELATED ART

Conventionally, it is a general procedure to convert an image signal to another type of a signal, and assign suitable codes to that converted signal based on statistic characteristics of the converted signal, and transmit the resulting coded signal. In this case, so-called predictive coding, which may compress information with a large compression ratio, is performed for a redundant image within a frame or an image including a regular pattern or a plain pattern, in such a manner that: since there may be a high correlation between adjacent pixels, it is possible to predict, to a certain degree, the next pixel value to be coded from a pixel value which has already been coded; only the components that could not be predicted are extracted and encoded.

In the case of a motion image in a videophone or the like, since adjacent frames of images are often very similar to each other, the temporal changes are limited; accordingly, such temporal redundancy may be removed by inter-frame predictive coding, which performs prediction between frames. At this time, so-called block-based coding may be generally performed in such a manner that: a block code is employed in which one codeword is assigned to a single symbol; each frame is divided into a plurality of pixel blocks; utilizing the characteristic that the luminance difference within each block is smaller, information is compressed.

Huffman coding is known as a method for generating a high efficiency code, which is one of entropy coding that may achieve data compression by assigning a high efficiency code to the converted signal. A representative thereof is arithmetic coding, which generates a codeword after another through an arithmetic calculation by dividing a probabilistic number line into segments in accordance with the occurrence probability of each sequence of symbols, and determining to accept the binary decimal indicating a location in a segment as a code for the sequence of symbols.

A conventional three-step block coding system for efficiently coding an image signal comprises the steps of sampling, transforming, and quantization. In order to retain two-dimensional resolution and high-frequency components for a given image signal, it is generally required to perform sampling at a frequency twice the highest frequency component.

With MPEG, it is preferable that the coding efficiency be as high as possible so that images with a high amount of information can be compressed. Accordingly, there are the conventional forward-predictive coding (P frame based processing), which uses as a predictive signal only the past image signal that has been already encoded, and the bi-directional predictive coding (B frame based processing), which uses as a predictive signal a future image signal as well as the past image signal. The conventional inter-frame predictive coding performs transmission of the difference signal between an input image signal and corresponding predictive image signal, and the decoding side performs addition of the transmitted difference signal to the already-decoded predictive image signal so as to reconstruct the original image. In this manner, it is impossible for the decoding side to reconstruct on the inter-frame basis if the predictive image signal is not provided. Accordingly, not using the past and future image signals as predictive signals, but using an intra-frame coded I frame (i.e., a reference frame that allows for reconstruction of an image from solely that frame), this I frame is inserted into a sequence of frames at a fixed interval, enabling reconstruction of an image partially through the sequence thereof and solving possible data errors.

However, since the conventional image signal compression technique employs the complicated block-based coding procedure, it is difficult to compress with a high compression ratio and at a high speed, image data such as audio information that can be subjected to predictive coding. When difference information is generally compressed through a motion image compression procedure, that is, when successive values A1 and A2 are expected to be similar to each other and when the value A1 is known before the value A2 occurs, assuming that the probability of occurrence of the difference between A2 and A1 being equal to or near zero be high, compression is performed using the conventional Huffman coding or the arithmetic coding; accordingly, if A1 and A2 can each take one of values 0, . . . , n, the difference between A2 and A1 can have one of 2n+1 values, thus 2n+1 Huffman codewords are necessary. Since there are actually n possible values for A2, but all of the n codes are not locally used, redundant codewords may be generated. Moreover, there is a problem that when the difference between frames is large, image quality intensely deteriorates and it is impossible to provide high image quality.

In addition, if a larger block size is used, compression ratio may be enhanced; however the detail of the original image may be lost causing image quality to deteriorate. A phenomenon wherein fine lines may be completely lost occurs when the original image is configured by such fine lines, the intensity thereof differing from that of a fixed colored background.

Furthermore, since the I frame to be periodically inserted into a sequence of frames is subjected to intra-frame coding, the coding efficiency is worse as compared to that of inter-frame coding, which encodes the difference between frames, so that generated amount of information increases; therefore, in such a case of a high speed communication line not being available, the frequency of insertion of I frames is limited. Moreover, since the amount of data within an I frame is between double to ten times that of data within a differential frame, that technique is against a fixed rate required for enabling communication. That is, conventionally, since I frames are periodically inserted into a sequence of frames, the processing time is fairly long so that displaying of the reconstructed image is delayed very long. In addition, since the amount of data itself is large, probability is high that data error impossible to be restored occurs within an I frame. Moreover, in case where such an error occurs causing reconstruction (or decoding) of an I frame to be impossible, the reconstruction processing halts until the subsequent I frame is reached if a dedicated means to solve the problem is not provided. For example, in case where data error occurs due to a cause, its initially small adverse influence may be amplified over the entire many frames; in the worst case, the reconstruction processing halts. Furthermore, with the conventional technique for inserting I frames at a fixed interval, it is needed, when the reconstruction processing starts at the frame at a certain temporal position, to search for the nearest I frame by some means, reconstruct the corresponding image therefrom, and display the reconstructed image after the frame at the target temporal position is reached; however, this searching for the I frame takes much time. If a certain dedicated means to solve the aforementioned problems is provided, the corresponding burden to be imposed on the decoding process naturally increases. In addition, since a heavy burden will be imposed on the process of reconstructing I frames, an additional function capable of processing the I frames is required for the process.

The present invention is provided considering the above problems, and its first object is to provide a method and system for compressing motion image information, which can compress with a high compression ratio and at a high speed, data or image information that can be subjected to the predictive coding, and which can improve image quality.

The second object of the present invention is to provide a method and system for compressing motion image information with the detail of the original image being preserved and without deterioration of image quality even if the compression ratio is enhanced by enlarging the block size.

Further, the third object is to provide a method and system for compressing motion image information, which can easily display the reconstructed image at an arbitrary temporal position by preventing an initially adverse influence due to an occurrence of data error during a reconstruction process from prevailing over all of the many frames and in turn the reconstruction process from halting, without much time being taken for first searching for the nearest I frame by some means when the reconstruction process starts at the frame at an arbitrary temporal position and then the corresponding image is reconstructed therefrom.

SUMMARY OF THE INVENTION

According to a motion image information compression method of a first embodiment of the present invention, which compares spatially adjacent pixels within a frame to each other or compares temporally adjacent pixels between frames, outputs the resulting difference information for pixels, stores in a bit map, information regarding on whether or not the output difference information is greater than a given parameter (threshold), and compresses the information stored in the bit map that is greater than the parameter (threshold), thereby reducing redundant information; by dividing an image within a frame into blocks and approximating (substituting) each divided block by a plane represented by three components for pixels within each block, the aforementioned problems are solved.

On the other hand, a system of compressing motion image information, according to the first embodiment of the present invention, comprises: bit map information recording means for comparing spatially adjacent pixels within a frame to each other or comparing temporally adjacent pixels between frames outputting the resulting difference information for pixels, and storing in a bit map, information regarding on whether or not the output difference information is greater than a given parameter (threshold), and information compression means for compressing the information stored by the bit map information recording means that is greater than the parameter (threshold), thereby reducing redundant information; the system further comprises block approximation means for dividing an image within a frame into blocks before an inter-frame compression is performed, and approximating (substituting) each divided block by a plane represented by three components for pixels within each block, thereby solving the aforementioned problems.

According to a motion image compression method of the second embodiment of the present invention, the intra-frame compression is performed by compressing the entire image in an n×m pixels block unit (n and m are integers, respectively) using a intra-frame compression method, comparing pixels between the original image and the image expanded after compressed outputting the resulting difference information of each pixel, and if a pixel that caused a larger difference than a given parameter (threshold) to occur exists, repeatedly using a smaller block size for a portion or a surrounding area including this pixel is performed until a designated minimum block size is reached; thereby solving aforementioned problems.

Furthermore, according to a motion image compression system of the second embodiment of the present invention, block approximation means performs an intra-frame compression by compressing the entire image in an n×m pixels block unit (n and m are integers, respectively) using a intra-frame compression method, comparing pixels between the original image and the image expanded after compressed, outputting the resulting difference information of each pixel, and if a pixel that caused a larger difference than a given parameter (threshold) to occur exists, repeatedly using a smaller block size for a portion or a surrounding area including this pixel until a designated minimum block size is reached; thereby also solving the aforementioned problems.

According to a motion image compression method of the third embodiment of the present invention, an intra-frame coded I frame (i.e., a reference frame solely from which an image can be reconstructed) is used; the I frame is spatially divided into I blocks; and no I block is inserted in any block within the frame that has been updated due to difference between frames being greater than a given parameter (threshold) within a specific period of time when dispersing the I blocks between each frame along the temporal axis; thereby also solving the aforementioned problems.

Furthermore, a motion image compression system of the third embodiment of the present invention comprises I block insertion means, which uses an intra-frame coded I frame (i.e., a reference frame solely from which an image can be reconstructed), spatially divides the I frame into I blocks, and disperses the I blocks between each frame along the temporal axis; the I block insertion means does not insert any I block in a block within the frame which has been updated due to difference between frames being greater than a given parameter (threshold) within a specific period of time; thereby also solving the aforementioned problems.

According to the motion image information compression method and system thereof, since a block conversion procedure is omitted, compression with a high compression ratio and at a high speed, of data or image information that can be subjected to predictive coding can be performed; thereby improving image quality. With the conventional technique, in particular, when difference between frames is large, image quality drastically deteriorates; however, according to the present invention deterioration of that image quality can be reduced. More specifically, according to the first embodiment of the present invention, it is possible to provide linear change in image quality without drastic deterioration of image quality due to a threshold for a block. Accordingly, adjustment of communication bit rate can be easily performed without deterioration of image quality, and in addition, improvement by approximately −20% to −50% of the compression ratio can be made with image quality maintained as is. Moreover, the adaptive Huffman coding and the adaptive arithmetic coding collectively perform the predictive coding procedure including the conventional difference information generation and the Huffman coding and/or the difference information generation and the arithmetic coding; thereby generating efficient code words and efficiently compressing data such as image information that can be subjected to predictive coding. Furthermore, the reduced (compressed) data according to the first embodiment of the present invention is used to define a plane, and when it is expanded, it represents a plane with a gradation.

According to an motion image information compression method and system of the second embodiment of the invention, even in the cases where the compression ratio is improved using a larger block size, the detail of the original image is not lost, and accordingly deterioration of image quality can be reduced. Even in cases of an original image configured by greatly deferent intensities of fine lines with a fixed colored background, it is possible to prevent that fine lines from being completely lost.

According to a motion image information compression method and system thereof of the third embodiment of the present invention, when an I frame is spatially pre-divided into blocks, and when the divided I blocks are dispersed between each frame along the temporal axis, since no I block is inserted in any block within the frame that has been updated due to difference between frames being greater than the parameter (threshold), it is possible for the image reconstruction processing to begin reconstruction since a predetermined number of previous frames from which an image can be completely reconstructed, and display a reconstructed image after the frame in the target temporal position is reached; thus without time-consuming search for an I frame, a reconstructed image can be easily displayed in an arbitrary position. In addition, since the amount of the distributed data in a communication server and/or data transmission path is temporally uniformized during motion image delivery, a higher transmission performance for content delivery than that with the conventional technique can be obtained. Moreover, since on the reception and reconstruction side change in the received amount per unit time is small, a necessary amount of buffering memory can be reduced, expected reconstruction loads are regulated, and even a system with low capacity can stably reconstruct. Moreover, since possible influence of data errors upon reconstruction is small, it is possible to continue to reconstruct with data error neglected; thereby not requiring the delivery side system to re-send data, and reducing the burden on the delivery side. Moreover, it is also possible to easily provide multicasting distribution capability, etc. for the motion image broadcasting.

BRIEF DESCRIPTION OF DRAWINGS

FIGS. 7A and 7B show an image explaining an inter-frame compression procedure, wherein FIG. 7A is a plan view of frame t and FIG. 7B is a plan view of frame t+1;

FIG. 11 is a flowchart showing the step of performing an inter-frame compression; and FIG. 12 is a flowchart showing the step of performing I block insertion.

DETAILED DESCRIPTION OF THE INVENTION

Figure 1:
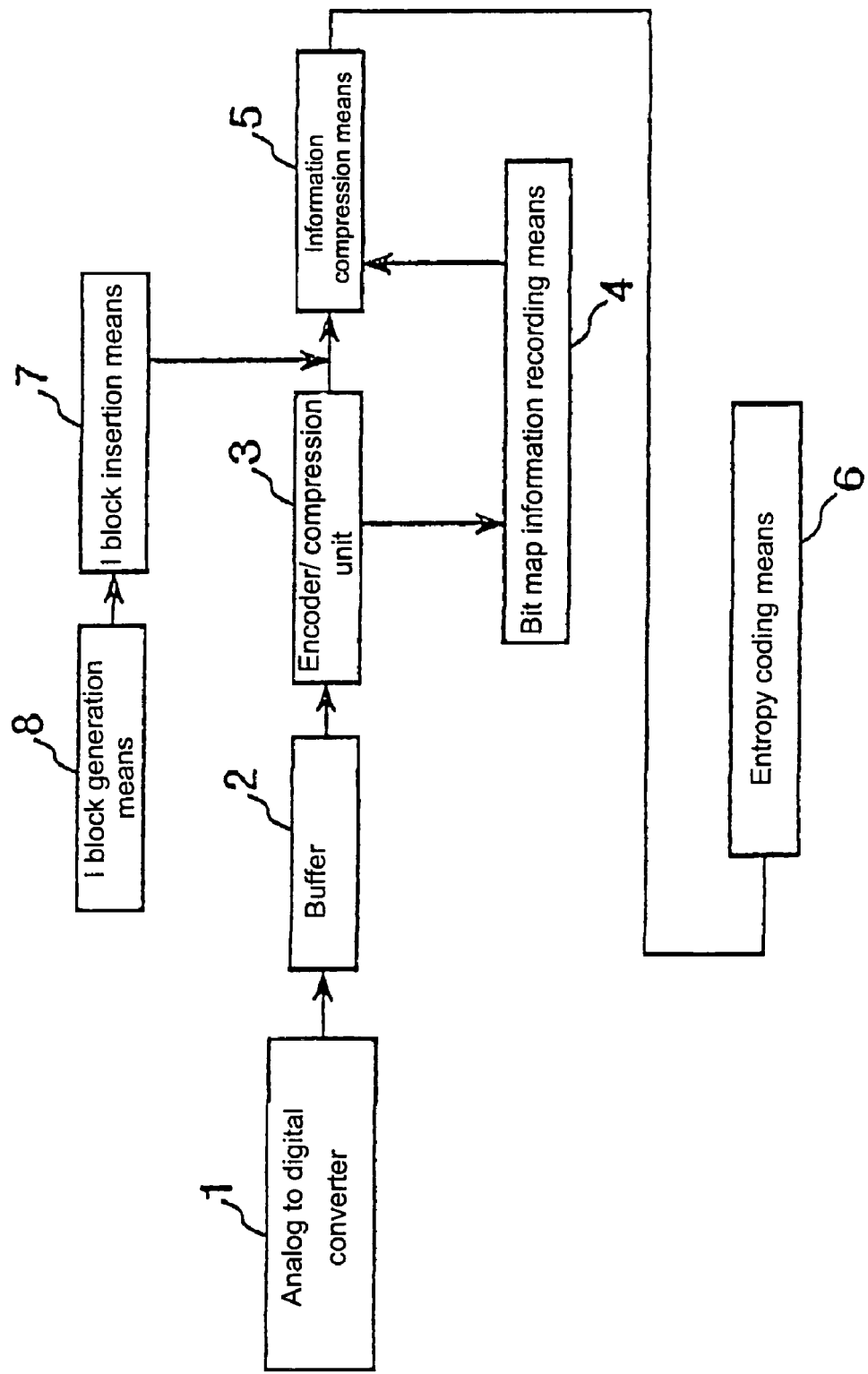
FIG. 1 is a block diagram showing the outline of a structure for compressing motion image information.

To begin with, a method of compressing motion image information according to a first embodiment of the present invention is described.

The present invention involves a motion image information compression method for comparing spatially adjacent pixels within a frame to each other or comparing temporally adjacent pixels between frames outputting the resulting difference information for pixels, storing in a bit map, information regarding on whether or not the output difference information is greater than a given parameter (threshold), and compressing information stored in said bit map that is greater than said parameter (threshold), thereby reducing redundant information; wherein am image within a frame is divided into blocks, and each divided block is approximated (substituted) with a single plane represented by three components for pixels within said block before the inter-frame compression processing starts.

Further, information stored in the bit map not greater than parameter (threshold) P is processed (deleted) as a changeless pixel.

Furthermore, according to a block approximation method of configuring a single plane represented by three components for pixels, the average and the method of least square are utilized.

Further, according to the intra-frame compression procedure, said plain is represented by three pieces of data: the intensity of a pixel within a block, the gradient of intensities within the block in the X direction, and the gradient of intensities within the block in the Y direction.

The information stored in the bit map is compressed by at least one binary image coding method selected from the group consisting of run length coding, modified READ (MR, MMR) coding, modified Huffman (MH) coding, and JBIG coding.

Information greater than parameter P (threshold) is compressed using the adaptive Huffman coding, which utilizes as many Huffman tables as the expected amount of information.

Redundant information between frames is further reduced using an entropy coding.

The entropy coding is performed either through the adaptive Huffman coding procedure, which encodes utilizing a table selected from as many Huffman tables as an expected amount of information, or the adaptive arithmetic coding procedure, which encodes utilizing a table selected from as many arithmetic tables as an expected amount of information.

This coding procedure is performed based on difference information between pixels.

This difference information is the difference output through comparison of pixel t and pixel t−1 between frames.

Furthermore, difference information output through comparison of a block of n×m pixels (where n and m are integers of 2 or more) and corresponding block of the same between frames is utilized.

Furthermore, difference information output through comparison of pixel t and pixel t−1 between said frames is utilized, where a block is configured by n×m pixels (n and m are integers of 2 or more) within a frame.

Furthermore, with n×m pixels between frames, n denotes $2^K$ (K is a whole number), and m denotes $2^{K'}$ (K' is a whole number.)

Furthermore, intra-frame compression may be performed while changing the size of blocks divided within the same frame, before the inter-frame compression procedure starts.

Next, a system for compressing motion image information according to a first embodiment of the present invention is described.

The present invention involves a motion image information compression system comprising: bit map information recording means 4 for comparing spatially adjacent pixels within a frame or comparing temporally adjacent pixels between frames, outputting the resulting difference information of the pixels, and storing in a bit map, information regarding on whether or not the output difference information is greater than a given parameter (threshold) P, and information compression means 5 for compressing the difference information stored by said bit map information recording means 5 that is greater than said parameter (threshold) P, thereby reducing redundant information; said system further comprises a block approximation means for dividing an image within a frame into blocks, and approximating (substituting) each divided block by a single plane represented by three components for pixels within said block.

Furthermore, information compression means 5 processes (deletes) the information stored by bit map information recording means 4 not larger than parameter (threshold) P as a changeless image.

Furthermore, the block approximation means approximates a single plane represented by three components for pixels using the average and the method of least square.

In addition, with the block approximation means, the plain is represented by three pieces of data: the intensity of a pixel within a block, the gradient of the intensities of the block in the X direction, and the gradient of the intensities of the block in the Y direction.

Further, the information stored by bit map information recording means 4 is compressed by at least one binary image coding method selected from the group consisting of run length coding, modified READ (MR, MMR) coding, modified Huffman (MH) coding, and JBIG coding.

Furthermore, information compression means 5 for compressing the information that is greater than parameter (threshold) P performs an adaptive Huffman coding using as many number of Huffman tables as a predictive amount of information.

Entropy coding means 6, which may reduce redundant information between frames, is further provided; this entropy coding means 6 performs either the adaptive Huffman coding, which encodes utilizing a table selected from as many Huffman tables as an expected amount of information, or the adaptive arithmetic coding, which encodes utilizing a table selected from as many arithmetic tables as an expected amount of information.

Furthermore, difference information stored in bit map information recording means 4 is a difference output through comparison of pixel t and pixel t−1 between the frames, where a block is configured by n×m pixels (n and m are integers of 2 or more) within a frame.

In the following, an embodiment of a method and system for compressing motion image information, according to the first aspect of the present invention, is described.

FIG. 1 is a block diagram showing the outline of a structure for compressing motion image information. A composite analog signal output from a device such as a video camera, a disk player, or a video cassette player according to the NTSC standard, is converted to a digital signal to represent a single line of a video frame by an analog-to-digital converter 1, and digitally output to buffer 2, where it is in turn stored. Note that although it is disclosed that the analog signal output from the NTSC device is converted to a digital signal by the analog-to-digital converter 1 and the resultant digital signal is output and stored in the buffer 2, the present invention is not limited to this structure. In other words, according to the present invention, any video signal including common video signals output from any of various types of devices can be efficiently compressed.

Figure 2:
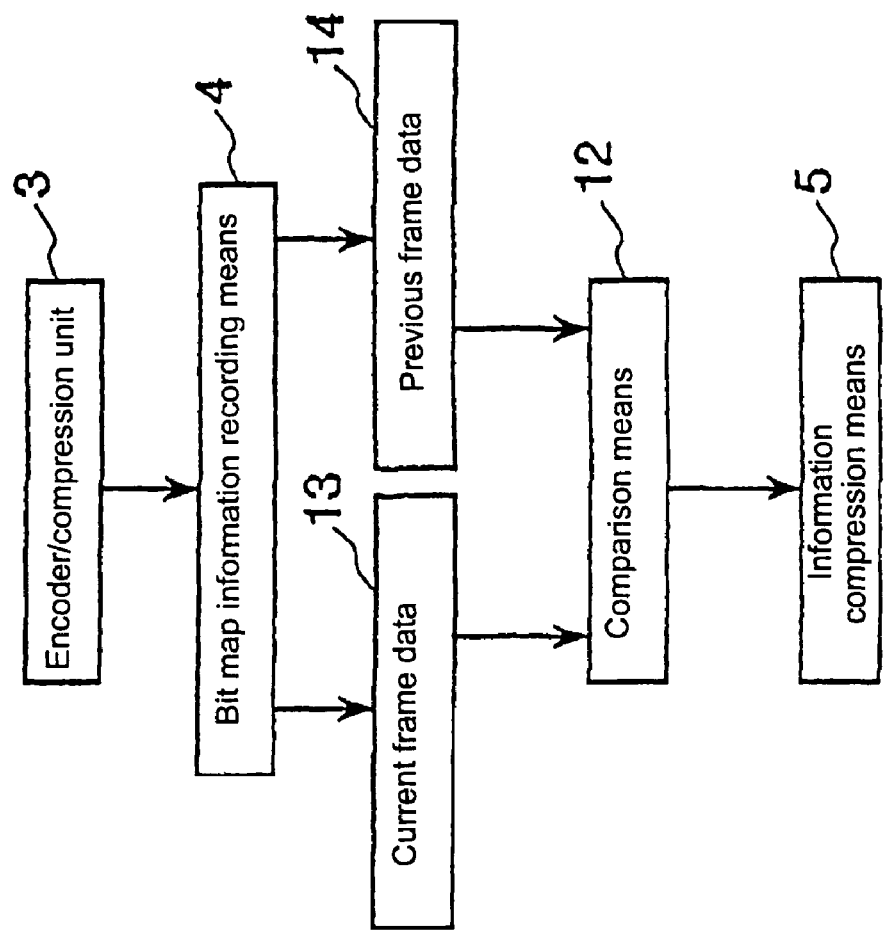
FIG. 2 is a block diagram detailing the structure for compressing motion image information in FIG. 1.

As shown in FIG. 1, bit map information storage circuit 4, which sequentially compares pixel t and pixel t−1 between frames, and stores in a single bit based bit map, information regarding on whether or not the resulting difference is greater than parameter (threshold) P, is provided. The comparison of this pixel t and pixel t−1 is performed based on a pixel component (i.e., intensity or hue). This is to temporally compare a pixel (pixel t) in the current frame and corresponding pixel (pixel t−1) in the previous frame; where t denotes time. Accordingly, the difference between pixels t and t−1 stored by bit map information recording means 4, which is greater than parameter (threshold) P, is compressed, but others are determined to be of changeless pixels and then processed (deleted). That information (difference) greater than parameter P (threshold) is compressed by information compression means 5 using the adaptive Huffman coding, which utilizes as many Huffman tables as the expected amount of information. Entropy coding means 6, which performs comparison of spatially or temporally adjacent pixels outputting the resulting difference information, and which then performs the adaptive arithmetic coding utilizing a arithmetic table, which is selected from as many arithmetic tables as, for example, an expected amount of information based upon predictive information so that redundant information between frames can be reduced, is provided. After encoding is performed by compression encoder 3, a block of data within each frame is then transmitted to a memory of bit map information recording means 4, as shown in FIG. 2. The current frame data 13 and the previous frame data 14 that is delayed by a single frame time are then stored. Afterwards, comparator 12 determines the current frame data 13 and the previous frame data 12 in terms of redundancy between frames and calculates the difference thereof. That is, each encoded block is compared to the corresponding block in the previous frame. Each block is marked with a single bit identifying whether or not that each block is changed from the corresponding previous block. Through this procedure, a frame bit map with a single bit per block is generated. Herein, the bit map for each frame is distinguished from another bit map by performing comparison between frames.

Figure 5:
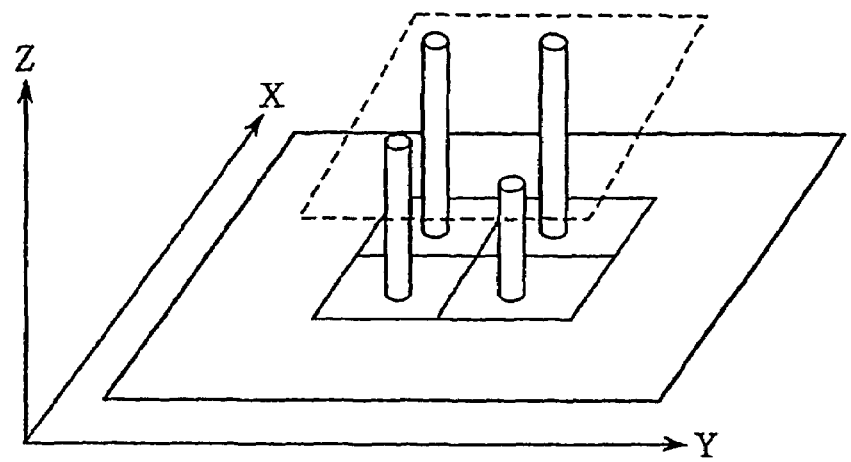
FIG. 5 is an explanatory figure showing a plane represented by three pieces of data: intensity Z of a pixel within a block, the gradient of the block in the X direction, and the gradient of the same block in the Y direction, which are used to approximate the corresponding divided image block.

This embodiment uses as a basic technique, the intra-frame compression technique in which the size of blocks is not changed. As shown in FIG. 5, an image within a frame is pre-divided into blocks, and every pre-divided block is approximated (substituted) with a single plane represented by three pieces of data: the intensity Z of a pixel in each block, the gradient of the intensities within each block in the X direction, and the gradient of the intensities in each block in the Y direction. More specifically, with the intra-frame compression procedure, an image is first divided into a plurality of blocks, and each block is substituted with a single plane that approximates that each block. This plane may be represented by three components for pixels in each block such as intensity z, gradient x of the intensities in the X direction, and gradient y of the intensities in the Y direction. Alternatively, that plane may be represented by intensity z of a pixel within a block, the gradient of the intensities of pixels between blocks in the X direction, and the gradient of the intensities of pixels between blocks in the Y direction. The average and the method of least square, for example, may be used for approximation. The resulting decreased (compressed) data represents a plane; by expanding that data, the plane with gradation is obtained. When a block is configured by s pixels, an expected compression ratio within a single frame is 3/s; the compression ratio increases while s increases, however, image quality deteriorates. It is noted that the size and shape of a block is of n×m pixels; where n and m are any one of integers. Furthermore, with n×m pixels between frames, n may denote $2^K$ (K is a whole number), and m may denote $2^{K'}$ (K' is a whole number.)

Next, the basic technique used for inter-frame compression according to this embodiment is described.

More specifically, according to the first method for inter-frame compression, the block in frame t−1 positioned at the same location as that in frame t is intra-frame compressed, and z(t+1), x(t+1), and y(t+1) are obtained in terms of three components: z denoting the intensity of a pixel, x denoting the gradient of the intensities in a block in the x direction, and, y denoting the gradient of the intensities in the block in the y direction. The sum-square-mean error is calculated between a group of z(t), x(t), and y(t) and a group of z(t+1), x(t+1), and y(t+1), and then compared with threshold P. As a result, if it exceeds threshold P, determination such as 'THERE IS DIFFERENCE' is made. Alternatively, each of a group of z(t), x(t), and y(t), and a group of z(t+1), x(t+1), and y(t+1) are compared to a group of thresholds Pz, Px, and Py; If the resulting difference exceeds threshold P, determination of 'THERE IS DIFFERENCE' is made. If the determination of 'THERE IS DIFERENCE' is made, the portion in the bit map corresponding to the block in the frame is marked.

In the former case, a single bit map is used, whereas three bit maps are used in the latter.

This bit map comprises an array including 0 and/or 1 (i.e., binary data), and it is compressed using, for example, run-length coding. In addition, the pieces of difference data $\Delta z(t)=z(t+1)-z(t)$, $\Delta x(t)=x(t+1)-x(t)$, and $\Delta y(t)=y(t+1)-y(t)$ are entropy compressed. It is noted that according to the first method, since expansion is not performed, the burden imposed on calculation is light, however, calculation errors may be accumulated.

According to the second method for inter-frame compression, data compressed using a basic technique for the above-mentioned inter-frame compression is expanded, and pieces of pixel data configuring a block are reconstructed. A sum-square-mean error between the respective pieces of pixel data each located at the same place within the same block in the next frame t+1 and corresponding reconstructed pieces of pixel data is calculated and compared to threshold P. As a result, if it exceeds threshold P, determination of 'THERE IS DIFFERENCE' is made. If the determination of 'THERE IS DIFERENCE' is made, the portion in the bit map corresponding to the block in the frame is marked. This bit map comprises an array including 0 and/or 1 (i.e., binary data), and it is compressed using, for example, run-length coding. In addition, the pieces of difference data $\Delta z(t)=z(t+1)-z(t)$, $\Delta x(t)=x(t+1)-x(t)$, and $\Delta y(t)=y(t+1)-y(t)$ are entropy compressed. It is noted that according to the second method, since expansion is performed, the burden imposed on calculation is heavy, however, calculation errors are not accumulated.

According to the third method for inter-frame compression, a sum-square-mean error between the respective pieces of pixel data within a block in the current frame t and corresponding pieces of pixel data each located at the corresponding identical place within the corresponding identical block in the next frame t+1 is calculated and compared to threshold P. As a result, if it exceeds threshold P, determination of 'THERE IS DIFFERENCE' is made. If the determination of 'THERE IS DIFERENCE' is made, difference ΔP from the corresponding pixel data located at the corresponding identical place within the corresponding identical block in the next frame t+1 is calculated and inter-frame compressed. The portion in the bit map corresponding to the block in the frame is marked. This bit map comprises an array including 0 and/or 1 (i.e., binary data), and it is compressed using, for example, run-length coding. Difference data ΔP is entropy compressed. It is noted that according to the third method, since compression is performed after determination of difference is made, the amount of the calculation is the least and calculation errors cannot be accumulated.

Entropy coding means 6 as shown in FIG. 1 compresses the single-bit based bit map information stored by bit map information recording means 4 using a binary image coding such as run length coding, modified READ (MR, MMR) coding, modified Huffman (MH) coding, or JBIG coding. More specifically, in the case of a binary document image generally handled by a facsimile machine or the like, there is a high probability that white pixels or black pixels successively appear in one or more continuous areas; accordingly with the run length coding method, a one-dimensional segment including only white or black pixels, which are called run, is employed as a unit for coding, and using the number of the continuous identical pixels included within each run as the length of each run, encoding is performed. For example, in digital facsimiles using the public telephone network, modified Huffman codes are generally used for the run length model being established separately for black and white pixels.

The modified Huffman coding (MH) is employed as a one-dimensional coding method in facsimile transmission of monochrome pixel information including 1728 pixels per scanning line, which is obtained by scanning at a pixel density of, for example, 8 pixels/mm; wherein the MH codes represent the run lengths each being the length of each segment including only continuous white pixels (white run) or only continuous black pixels (black run), and variable length codes are assigned to the respective runs using the statistical tendency that white or black runs having particular lengths occur more frequently than the other lengths, which is the theory for reducing the amount of data.

The modified READ (MR or MMR) coding is used as a standard method for two dimensional coding as well as one dimensional coding; where the MMR coding is the one that both the standard resolution and the high resolution for MR coding are set to infinity.

The basic structure of the compression method of motion image information and system thereof according to the present invention is to compare spatially or temporally adjacent pixels and output the resulting difference information so that redundant information between frames can be reduced. More specifically, pixel t and pixel t−1 between frames are sequentially compared, and information regarding on whether or not the resulting difference is greater than parameter (threshold) P is stored as a single bit piece of bit map information. Entropy coding means 6 predicts codes that may occur within each frame and between frames, and outputs a small error from the predicted value so that redundant information can be reduced. It is well known that the average code length per pixel never be less than or equal to the average information content (i.e., entropy) when codes assignment is performed and the resulting sequence of codes are transmitted.

The adaptive Huffman coding algorithm is described below. The adaptive Huffman coding is performed, so as to efficiently generate codewords by collectively performing a series of predictive coding procedures including generating of difference information and Huffman coding thereof. According to the conventional Huffman coding, codewords are generally generated using a Huffman table, and the generated Huffman table is updated whenever each single word is encoded, or the Huffman coding procedure is dynamically performed. In contrast, according to the adaptive Huffman coding, using as many Huffman table (code table) as the predicted amount of information one of that many tables is selected by a table selector in conformity with predicted information; with that selected table encoding is performed. Accordingly, data such as audio information, which can be subjected to the predictive encoding, is effectively compressed.

The adaptive arithmetic coding algorithm is described below. The adaptive arithmetic coding is performed, so as to efficiently generate codewords by collectively performing a series of predictive coding procedures including generating of difference information and arithmetic coding thereof. According to the conventional arithmetic coding, codewords are generally generated using a single occurrence probability table, and the generated occurrence probability table is updated whenever each single word is encoded, or the arithmetic coding procedure is dynamically performed. In contrast, according to the adaptive arithmetic coding, using as many arithmetic table (code table) as the predicted amount of information one of that many tables is selected by a table selector in conformity with predicted information; with that selected table encoding is performed. Accordingly, data such as image information, which can be subjected to the predictive encoding, is effectively compressed.

Figure 3:
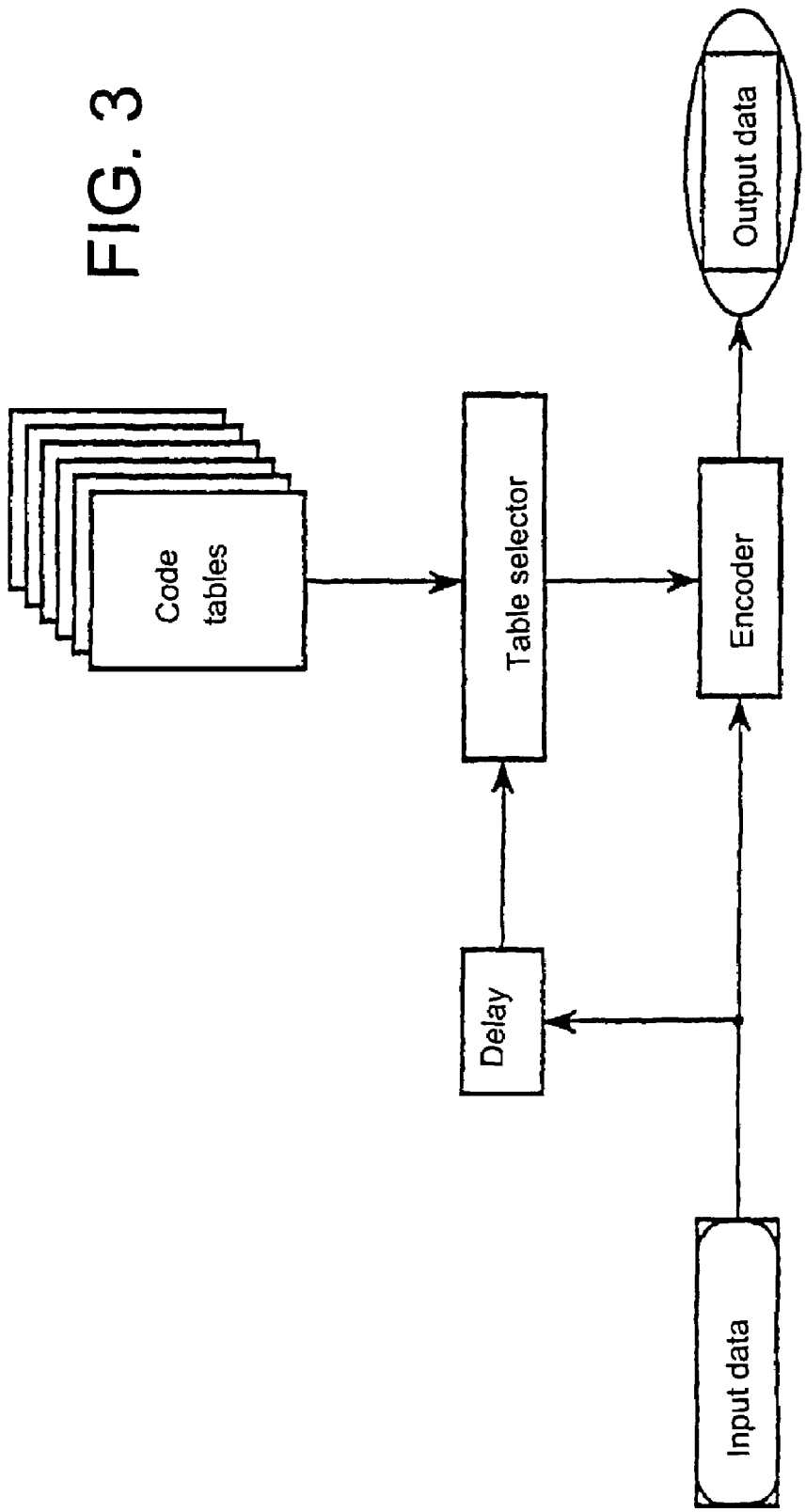
FIG. 3 illustrates an example of a specific structure for coding.

A specific structure of a predictive encoding circuit is shown in FIG. 3 in which in order to encode input image data, which is analog to digital converted, it is suitably delayed and coupled to the table selector. The input image data is also transmitted without any delay to the encoding unit, which then encodes it. The resulting pieces of encoded data are compared and their difference is then calculated. The table selector selects one code table for the input image data in conformity with predictive information, transmitting it to the encoding unit, which in turn compresses the input image data so that adjusted codewords can be obtained.

Figure 4:
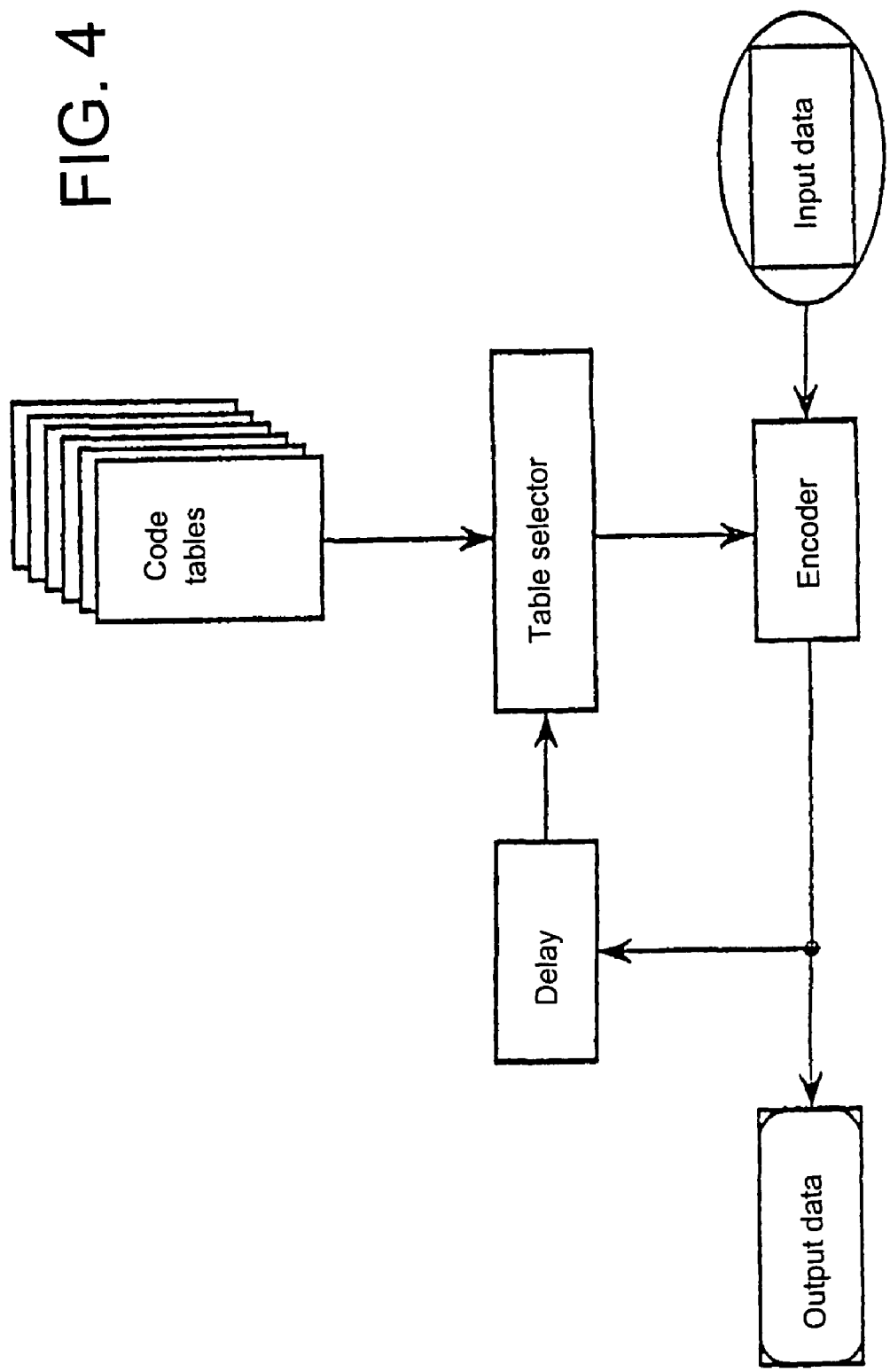
FIG. 4 is an explanatory block diagram showing an example of a specific structure for decoding.

A specific structure of a predictive decoding circuit is shown in FIG. 4 in which a codeword is transmitted to the decoder, and at the same time the directly transmitted codeword is temporally sent to the table selector, which then selects a decode table in conformity with predictive information sending back it to the decoder, which in turn calculates difference from the previously decoded pixel value so that adjusted codewords can be obtained.

A method for compressing motion image information according to a second embodiment of the present invention is further described.

The present invention is a method of compressing motion image information by comparing spatially adjacent pixels within a frame or comparing temporally adjacent pixels between frames, outputting the resulting difference information of the pixel values, storing in a bit map, information regarding on whether or not the output difference information is greater than a given parameter (threshold) P, and compressing the difference information that is greater than said parameter (threshold) P in conformity with the information stored in said bit map; thereby reducing redundant information; wherein the intra-frame compression is performed while changing the divided block size within the same frame before the inter-frame compression is performed.

According to intra-frame compression procedure, pixels within each block are compared outputting the resulting difference information of the pixels while changing the divided block size, and if that difference information is greater than parameter (threshold) P, a smaller block size is used for portion including this difference information.

In addition, if the difference information between pixels is greater than parameter (threshold) P, a smaller block size is repeatedly used.

An image within a frame is divided into blocks, and each block is approximated (substituted) with a single plane represented by at least three components for pixels within each block.

Further, according to the intra-frame compression procedure, said plain is represented by three pieces of data: the intensity of a pixel within a block, the gradient of the intensities within the block in the X direction, and the gradient of the intensities within the block in the Y direction.

According to the intra-frame compression procedure, the entire image is compressed in an n×m pixels block unit (n and m are integers, respectively) using a intra-frame compression method, pixels between the original image and the image expanded after compressed are compared outputting the resulting each difference information for pixels, and if a pixel that caused a larger difference than parameter (threshold) P to occur exists, the operation of using a smaller block size for a portion or a surrounding area including this pixel is repeatedly performed until a designated minimum block size is reached.

Further, if there is no change in the block size during the intra-frame compression procedure, the inter-frame compression procedure starts.

If the block size is changed into a larger one, an additional calculation for difference of data in said block is not performed outputting as it is.

If the block size is changed into a smaller one, difference from the previous expanded data is calculated within each portion, and compressed in that smaller block size.

Next, a system for compressing motion image information according to a second embodiment of the present invention is described.

According to the intra-frame compression procedure, the entire image is compressed in an n×m pixels block unit (n and m are integers, respectively) using a intra-frame compression method, pixels between the original image and the image expanded after compressed are compared outputting the resulting each difference information for pixels, and if a pixel that caused a larger difference than parameter (threshold) P to occur exists, the operation of using an ever smaller block size for a portion or a surrounding area including this pixel is repeatedly performed until a designated minimum block size is reached.

Further, with the block approximation means, if there is no change in the block size during the intra-frame compression procedure, the inter-frame compression procedure starts.

Further, with the block approximation means, if the block size is changed into a larger one, an additional calculation for difference of data in said block is not performed outputting as it is.

Further, with the block approximation means, if the block size is changed into a smaller one, difference from the previous expanded data is calculated within each portion, and compressed in that smaller block size.

Figure 10:
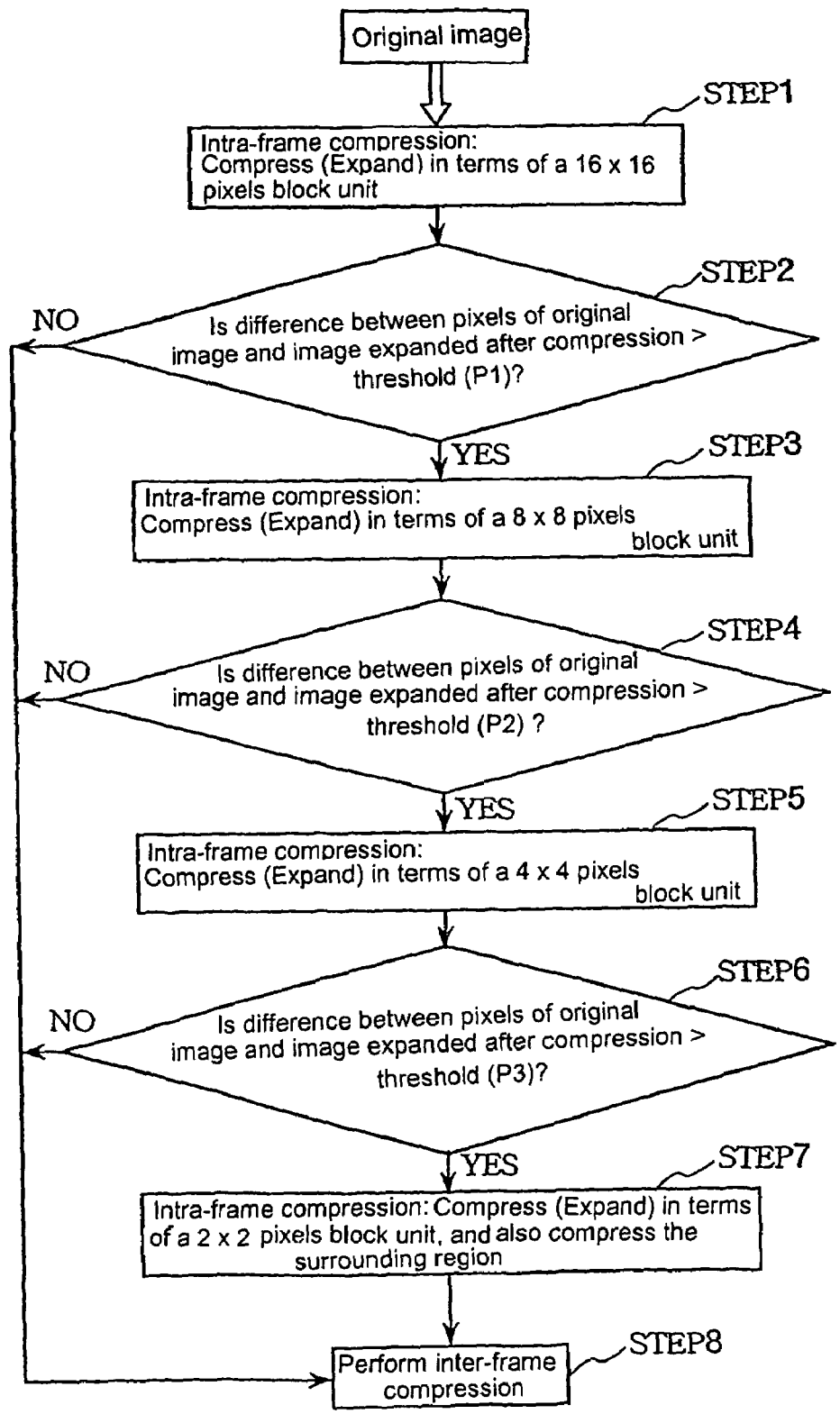
FIG. 10 is a flowchart showing the step of performing an intra-frame compression.

In the following, a method and system for compressing motion image information according to the second embodiment of the present invention are described while referring FIGS. 6, 7 and 10.

As described above, if a larger block size is used, compression ratio may be enhanced; however the detail of the original image may be lost deteriorating image quality. A phenomenon where fine lines are completely lost happens when the original image is configured by such fine lines the intensity thereof differing from that of a fixed colored background. The following method is utilized so as to solve these problems. To simplify explanation, the case (an example) of 16×16 pixels of a white image is described.

Figure 6:
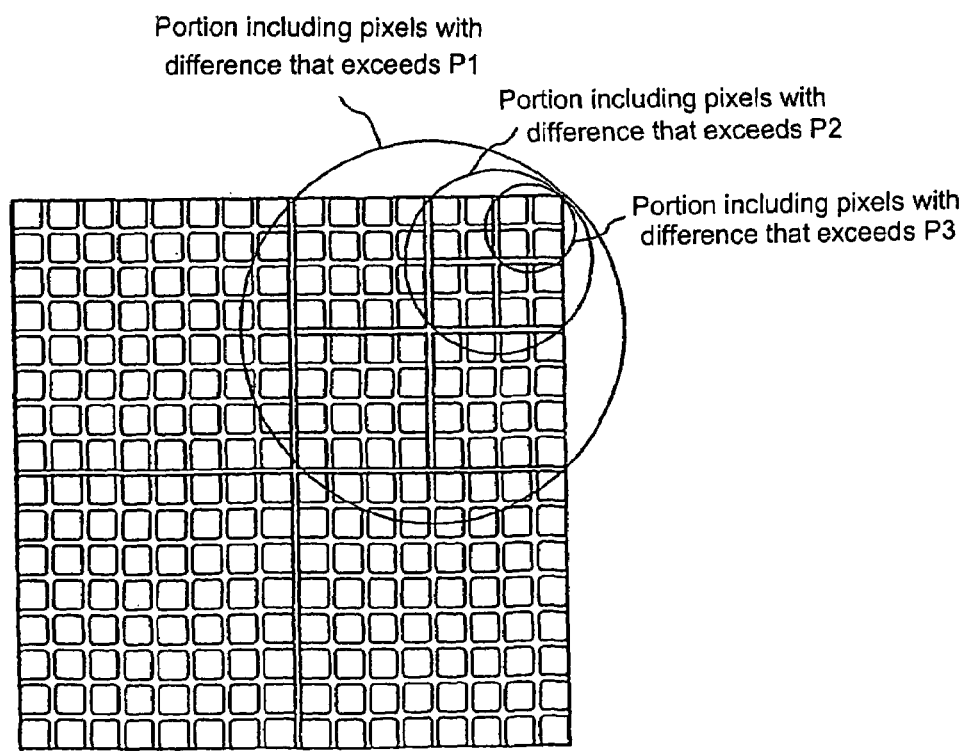
FIG. 6 is a plan view of an image explaining the operation of using a smaller block size for a portion or a surrounding region of a pixel that causes larger difference than a given parameter (threshold) to occur.

More specifically, as shown in FIGS. 6 and 10, the entire image is compressed (expanded) in a 16×16 pixels block unit using an intra-frame compression method as described above (STEP 1 in FIG. 10). Pixels between the original image and the image expanded after compressed are compared outputting the resulting difference information of each pixel, which is then compared to parameter (threshold) P (STEP 2 in FIG. 10). As a result of this comparison, if there is a pixel with difference exceeding parameter (threshold) P1, a portion or a 8×8 pixels block including this pixel is compressed (expanded) (see STEP 3 in FIG. 10 and the largest circle in FIG. 6). In addition, the surrounding area of that portion is compressed in a 8×8 pixels block unit. Afterwards, pixels between the original image and the image expanded after compressed are compared outputting the resulting difference information of each pixel, which is then compared to parameter (threshold) P2 (STEP 4 in FIG. 10). As a result of this comparison, if there is a pixel with difference exceeding parameter (threshold) P2, a portion or a 4×4 pixels block including this pixel is compressed (expanded) (see STEP 5 in FIG. 10 and the middle circle in FIG. 6). In addition, the surrounding area of that portion is compressed in a 4×4 pixels block unit. Pixels between the original image and the image expanded after compressed are compared outputting the resulting difference information of each pixel, which is then compared to parameter (threshold) P3 (STEP 6 in FIG. 10). As a result of this comparison, if there is a pixel with difference exceeding parameter (threshold) P3, a portion or a 2×2 pixels block including this pixel is compressed (expanded) (see STEP 7 in FIG. 10 and the smallest circle in FIG. 6). In addition, the surrounding area of that portion is compressed in a 2×2 pixels block unit. The procedure continues to the inter-frame compression step (STEP 8 in FIG. 10). In this manner, it is possible to compress the original image with its detail maintained while maintaining a high compression ratio.

Figure 7A:
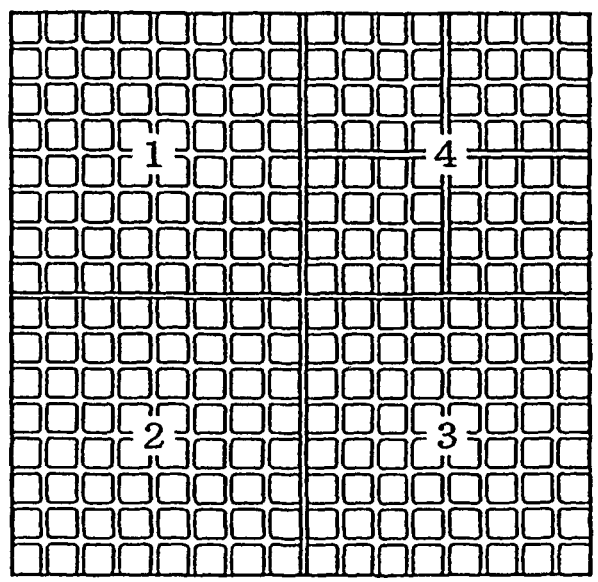
Figure 7B:
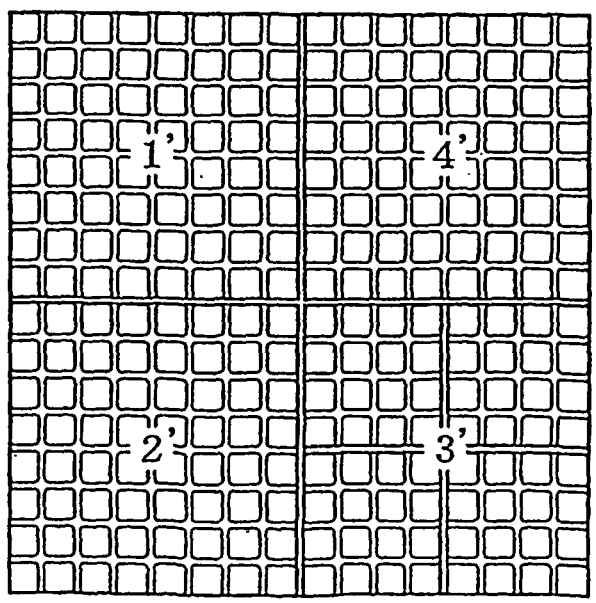

Next, as a result of the intra-frame compression as mentioned above, an inter-frame compression method in the case where a compressed image of frame t in FIG. 7A and a compressed image of frame t+1 in FIG. 7B are obtained is described while referring FIG. 11. The block sizes are compared (STEP 9); since there are no change in the block size between 1 in FIG. 7A and 1' in FIG. 7B and between 2 in FIG. 7A and 2' in FIG. 7B, difference is calculated and inter-frame compressed using one of the methods described in the aforementioned inter-frame compression procedure (STEP 10). Afterwards, it is determined whether or not difference in each block size is equal to parameter (threshold) P or greater (in STEP 15). If it is determined that difference in each block size is equal to parameter (threshold) P or greater, the effect that THERE IS DIFERENCE is recorded in a bit map outputting the difference (in STEP 16). Otherwise, if it is determined that difference in each block size is less than parameter (threshold) P, the bit map is stored and updated with the effect that THERE IS NO DIFERENCE, outputting the difference (see STEP 17). Incidentally, in the case where there is change in the block size, in particular where there is change towards more coarse resolution (STEP 11) such as the change between 4 and 4' in FIG. 7, 4' is used as a key block (or a key frame) that can be extended by itself independent from the previous frame. In this case, no difference is calculated. In other words, difference of data in the block 4' is not calculated outputting as it is (STEP 12). In the case where there is change in the block size, in particular where there is change towards finer resolution (STEP 13) such as the change between 3 in FIG. 7A and 3' in FIG. 7B, difference from the extended data within block 3 is calculated for each portion and compressed in terms of the block size unit (in STEP 14).

Next, a method of compressing motion image information according to the third embodiment of the present invention is described.

According to the present invention, intra-frame encoded I frames (i.e., base frames solely from which the corresponding image can be reconstructed) are used; each I frame is spatially pre-divided into a plurality of I blocks, which are then dispersed between each frame along the temporal axis.

When the respective I blocks, which are spatially divided, are dispersed between each frame along the temporal axis, no I block is inserted into any block within the frame updated at a time when a state that the difference between frames is greater than parameter (threshold) P happens.

Furthermore, a compression method is provided where: an image within a frame is pre-divided into blocks, all the divided blocks are each approximated (substituted) with a single plane represented by three pieces of data: the intensity of a pixel in each block, the gradient of each block in the X direction, and the gradient of each block in the Y direction; and using an intra-frame coded I frame (i.e., a reference frame solely from which an image can be reconstructed), said I fame is inserted within a sequence of frames; wherein: said I frame is spatially pre-divided into blocks; when the divided I blocks are dispersed between each frame along the temporal axis, no I block is inserted in any block within the frame that has been updated due to difference between frames being greater than parameter (threshold) P within a specific period of time.

A method of compressing motion image information is provided, where spatially adjacent pixels within a frame are compared or pixels between temporarily adjacent frames are compared to output the resulting difference information between the pixels; information regarding on whether or not the output difference information is greater than a given parameter (threshold) is stored in a bit map; and the difference information stored in the bit map that is greater than said parameter (threshold) P is compressed; thereby reducing redundant information; wherein: using an intra-frame coded I frame (i.e., a reference frame solely from which an image can be reconstructed), said I fame is spatially pre-divided into blocks; and when the divided I blocks are dispersed between each frame along the temporal axis, no I block is inserted in any block within the frame that has been updated due to difference between frames being greater than parameter (threshold) P within a specific period of time.

Further, a method for compressing motion image information according to the third embodiment of the present invention is described.

According to the present invention, intra-frame encoded I frames (i.e., base frames solely from which the corresponding image can be reconstructed) are used; each I frame is spatially pre-divided into a plurality of I blocks, which are then dispersed between each frame along the temporal axis.

I block insertion means 7 does not insert any I block in a block within the frame that has been updated due to difference between frames being greater than parameter (threshold) P within a specific period of time.

Furthermore, a compression system is provided comprising a block approximation means for dividing an image within a frame into blocks and approximating (substituting) each of all the divided blocks by a single plane represented by three pieces of data: the intensity of a pixel in each block, the gradient of each block in the X direction, and the gradient of each block in the Y direction; said system further comprises: I block generation means 8 for spatially dividing an intra-frame coded I frame (i.e., a reference frame solely from which an image can be reconstructed) into I blocks; and I block insertion means 7 for inserting an I block in a portion except for a block within the frame that has been updated due to difference between frames being greater than parameter (threshold) P within a specific period of time, when the divided I blocks are dispersed between each frame along the temporal axis.

In the following, a method and system for compressing motion image information according to the third embodiment of the present invention are described while referring FIGS. 8, 9 and 12.

The present invention is an encoding method, which corresponds to partial sequence image reconstruction (decoding) and/or data error occurring during that image reconstruction. It is noted that there is a premise that a compression algorithm is used without use of any motion prediction and correction technique for more than three entire frames that are to be compressed.

First, as shown in FIG. 12, an intra-frame predictive coded frame or an I frame is spatially divided into a single or multiple I blocks (in STEP 1), and these divided I blocks are dispersed along the temporal axis (generation of I blocks in STEP 2.) It is noted that the block size, the divided block shape, etc. due to that generation of I blocks can be optionally changed, and moreover they can be randomly selected.

Figure 8:
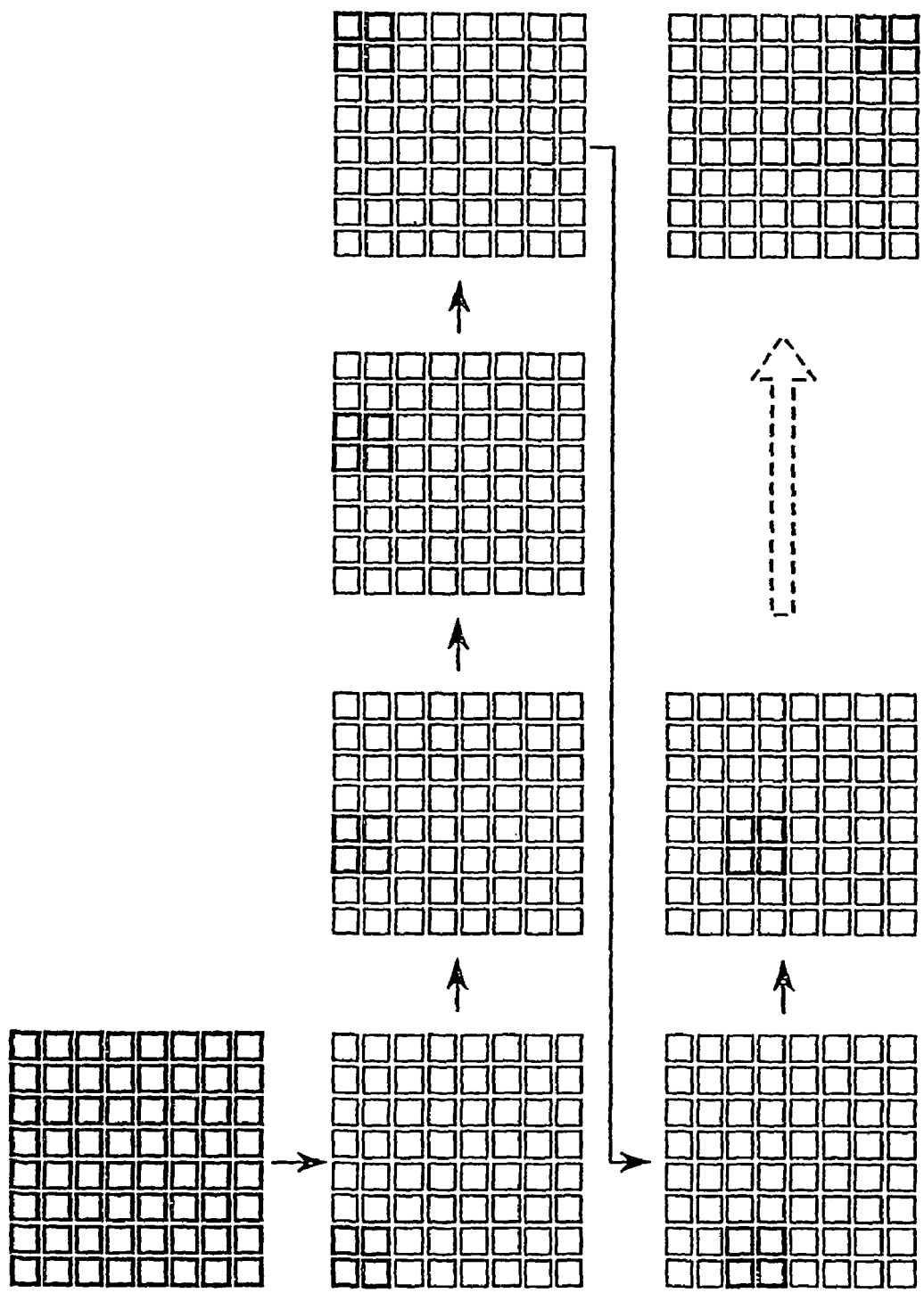
FIG. 8 is a plan view showing a plurality of I blocks that configures an I frame.

More specifically, as shown in FIG. 8, an I frame of 8×8 pixels is spatially divided into sixteen I blocks each having 2×2 pixels, and these are inserted into a sequence of frames at fixed period intervals. As a result, when the portion where a inter-frame difference output occurs (i.e., the portion with large information content where there is a motion) and an I block (the information content of which is greater than that of the other frame) overlaps, a useless I block should be inserted drastically increasing the information content, which may cause errors impossible to be recovered to happen within the inserted I frame. In order to avoid this, as shown in FIG. 12, in cases where there is no problem with the processing speed on the encoding side, whether or not the state of the inter-frame difference greater than parameter (threshold) P occurs within a designated period of time and updating (outputting of the difference) is accordingly performed is determined (in STEP 3), and no I block is inserted in any block that is updated (or that outputs a difference) (in STEP 4.) On the other hand, an I block is inserted to the block that is not updated (or that outputs a difference) (in STEP 5.)

Figure 9:
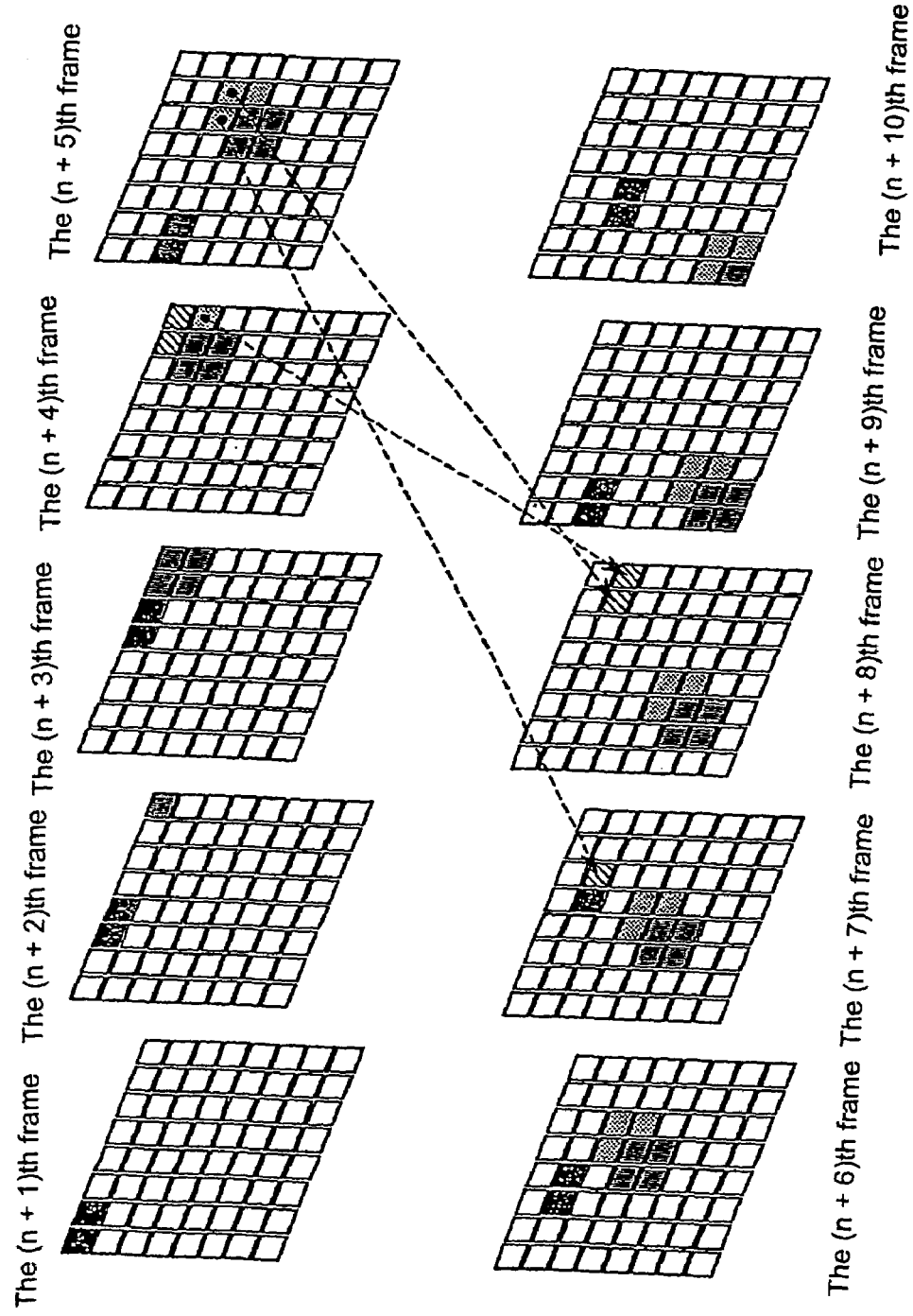
FIG. 9 is an explanatory figure showing a state where I blocks are inserted between frames.

Referencing FIG. 9, a specific encoding method is described. It is noted here that an I frame of 8×8 pixels is spatially divided into a block of 1×2 pixels by I block generation means 8 configuring thirty-two I blocks altogether, as an example. It is also noted here that a motion image is provided as an example comprising an image frame with a block of 8×8 pixels and with the maximum block of 16×16 pixels. In FIG. 9, as a matter of convenience, the (n+11)th to the (n+32)th are omitted.

First, the I blocks each horizontally having 1×2 pixels, which are marked in black in the Figure, are inserted. An object (dark gray regions representing a difference outputting block that moves against the background), which is initially positioned on the upper left corner in the image and which requires the maximum of 2×2 pixels to be updated (i.e., to output difference) moves towards the lower left. Until the (n+3)th frame, an I block is generally inserted (in STEP 5 of FIG. 12.) In contrast, since the block corresponding to the object appeared on the upper right in the (n+3)th frame is updated (i.e., outputs difference), the I block to be inserted within the (n+4)th frame is not actually inserted (see the shaded portion and STEP 4 in FIG. 12). It is noted that the light gray portion denotes a difference outputting block that is coming back to portion of the original background because the object has moved. In this case, the processing where no I block is inserted (see STEP 4 in FIG. 12) appears in the (n+7)th frame and (n+8)th frame. More specifically, as a result of the movement of the object in the (n+5)th frame, if a difference outputting block (the light gray portion) that should be back to portion of the background exists as a portion to be updated, within the (n+7)th frame, only the single block on the right side of the I blocks each having 1×2 pixels is not inserted in that portion. As a result of the movement of the object in the (n+4)th and the (n+5)th frames, if a difference outputting block (the light gray portion) of horizontally positioned 1×2 pixels that should be back to portion of the background exists as a portion to be updated, within the (n+8)th frame, an I block of 1×2 pixels is not inserted in that portion. In this case, the reference time (the near past) during which any I block should not be inserted is represented by the number of the frames needed for 1 blocks to be inserted to every block position (8×8/2=32 frames.) In other words, no I block is inserted in any blocks that are updated (outputs difference) within a sequence of thirty-two frames due to the movement of an object, etc. In order to start reconstructing a desired frame at an arbitrary temporal position, decoding should begin a predetermined number of frames earlier to allow complete reconstruction of a single image.

As described above, with a motion image information compression method and system thereof, according to the first embodiment of the present invention, an intra-frame image is pre-divided into blocks, every divided block is approximated with a single plane represented by three pieces of data: the intensity of a pixel within each block, the gradient of said each block in the X direction, and the gradient of said each block in the Y direction, thereby efficiently performing the intra-frame compression.

According to a motion image information compression method and system thereof, the intra-frame compression is performed by compressing the entire image in an n×m pixels block unit (n and m are integers, respectively), pixels between the original image and the image expanded after compressed are compared outputting the resulting difference information of each pixel, and if a pixel that caused a larger difference than parameter (threshold) P to occur exists, repeatedly using a larger block size for a portion or a surrounding area including this pixel until a designated minimum block size is reached, thereby maintaining the detail of the original image and preventing deterioration of image quality.

With a motion image information compression method and system thereof, according to the third embodiment of the present invention, an I frame is spatially pre-divided into I blocks, and when the divided I blocks are dispersed between each frame along the temporal axis, no I block is inserted in any block within the frame that has been updated due to difference between frames being greater than a given parameter (threshold) within a specific period of time; therefore reconstruction of an image can be performed by starting reconstruction a predetermined number of frames earlier so that a single image can be completely reconstructed, and displaying the reconstructed image after the temporally positioned target frame is reached; thereby easily displaying a reconstructed image in an optionally temporal position without much time being taken for searching for the I frame.

In addition, since the amount of distributed data at a delivery server and/or in the data communication path during the delivery of a motion image is temporally uniformized, a higher distribution performance than that with the conventional content distribution technique is obtained. On the reception/reconstruction side, since change in the received amount per unit time is small, a necessary amount of buffering memory can be reduced, and moreover since the burden imposed on the reconstruction processing is regulated, even a system with low performance can perform steady reconstruction. In addition, since the influence of data errors on the reconstruction processing is small, the reconstruction processing can continue with such data errors neglected; therefore, it is unnecessary for the distribution side system to re-send data, and lighter burden is imposed on the distribution side. Moreover, it is also possible to easily provide multicast distribution capability, etc. for the motion image broadcasting.

As described above, the present invention is an optimal means for efficiently compressing motion image information, and can be widely used in the fields of transmission, reception, and reconstruction of a variety of motion image information.

The disclosure of U.S. Pat. No. 750,118 filed on Dec. 29, 2000 and International Application No. PCT/JP02/00713, filed Jan. 30, 2002 including specification, drawings and claims is incorporated herein by reference in its entirety.

Although only some exemplary embodiments of this invention have been described in detail above, those skilled in the art will readily appreciated that many modifications are possible in the exemplary embodiments without materially departing from the novel teachings and advantages of this invention. Accordingly, all such modifications are intended to be included within the scope of this invention.

What is claimed is:

1. A method of compressing motion image information which compares spatially adjacent pixels within a frame or compares pixels between temporarily adjacent frames to output difference information between the pixels; stores in a bit map, information regarding on whether or not the output difference information is greater than a given parameter (threshold), and compresses the difference information stored in said bit map that is greater than said parameter (threshold) P, thereby reducing redundant information;

said method comprising dividing an image within a frame into blocks and approximating (substituting) each block as a single plane represented by at least three components for pixels within each block before an inter-frame compression procedure begins.

2. The method of compressing motion image information according to claim 1, wherein information that is not greater than the parameter (threshold) stored in a bit map is processed (deleted) as a changeless pixel.

3. The method of compressing motion image information according to either of claim 1 or 2, wherein said approximating of each block as a single plane represented by at least three components for pixels utilizes an average or the least squares method.

4. The method of compressing motion image information according to one of claims 1 through 3, wherein the intra-frame compression is performed with said plain represented by three pieces of data: intensity of a pixel within a block, the gradient of intensities within the block in the X direction, and the gradient of intensities within the block in the Y direction.

5. The method of compressing motion image information according to one of claims 1 through 4, wherein the information stored in the bit map is compressed using at least one binary image coding method selected from the group consisting of run length coding, modified READ (MR, MMR) coding, modified Huffman (MH) coding, and JBIG coding.

6. The method of compressing motion image information according to one of claims 1 through 5, wherein the information greater than parameter P (threshold) is compressed using the adaptive Huffman coding, which utilizes as many Huffman tables as the expected number of pieces of information.

7. The method of compressing motion image information according to one of claims 1 through 6, further comprising reducing redundant information between frames using entropy coding.

8. The method of compressing motion image information according to claim 7, wherein the entropy coding is performed either through the adaptive Huffman coding, which encodes utilizing a table selected from as many Huffman tables as an expected amount of pieces of information, or the adaptive arithmetic coding, which encodes utilizing a table selected from as many arithmetic tables as an expected amount of pieces of information.

9. The method of compressing motion image information according to one of claims 1 through 8, wherein difference information between pixels is utilized.

10. The method of compressing motion image information according to one of claims 1 through 9, wherein the difference information is the difference output through comparison of pixel t and pixel t−1 between frames.

11. The method of compressing motion image information according to one of claims 1 through 10, wherein difference information output through comparison of pixel t and pixel t−1 between said frames is utilized, where n×m pixels between frames configure a single block (n and m are integers of 2 or more).

12. The method of compressing motion image information according to one of claims 1 through 11, wherein difference information output through comparison of pixel t and pixel t−1 between said frames is utilized, where n×m pixels within a frame configures a single block (n and m are integers of 2 or more).

13. The method of compressing motion image information according to one of claims 1 through 12, wherein with said n×m pixels between frames, n denotes $2^K$ (K is a whole number), and m denotes $2^{K'}$ (K' is a whole number.)

14. The method of compressing motion image information according to one of claims 1 through 13, further comprising performing intra-frame compression while changing the divided block size within the same frame, before inter-frame compression procedure starts.

15. A method of compressing motion image information which: compares spatially adjacent pixels within a frame or compares temporally adjacent pixels between frames outputting the resulting difference information for pixels; stores in a bit map, information regarding on whether or not the output difference information is greater than a given parameter (threshold), and compresses information stored in said bit map that is greater than said parameter (threshold); thereby reducing redundant information;

said method comprising performing intra-frame compression while changing the divided block size within the same frame before inter-frame compression procedure starts.

16. A method of compressing motion image information according to claim 15, wherein said intra-frame compression is performed by comparing pixels within each block while changing the divided block size, outputting the resulting difference information for pixels, and using a smaller block size for portion including the difference information if the difference information is greater than parameter (threshold) P.

17. A method of compressing motion image information according to either claim 15 or 16, wherein if the difference information between pixels is greater than parameter (threshold) P, an ever smaller block size is repeatedly used.

18. A method of compressing motion image information according to one of claims 15 through 17, further comprising dividing an image within a frame into blocks, and approximating (substituting) each block with a single plane represented by at least three components for pixels within said each block.

19. The method of compressing motion image information according to one of claims 15 to 18, wherein the intra-frame compression is performed with said plain represented by three pieces of data: intensity of a pixel within a block, the gradient of intensities within the block in the X direction, and the gradient of intensities within the block in the Y direction.

20. The method of compressing motion image information according to one of claims 15 to 19, the intra-frame compression is performed by compressing the entire image in an n×m pixels block unit (n and m are integers, respectively) using a intra-frame compression method, comparing pixels between the original image and the image expanded after compressed, outputting the resulting difference information of each pixel, and if a pixel that caused larger difference than parameter (threshold) P to occur exists, repeatedly using a ever smaller block size for a portion or a surrounding area including this pixel until a designated minimum block size is reached.

21. The method of compressing motion image information according to one of claims 15 to 20, wherein when there is no change in the block size as a result of the intra-frame compression, inter-frame compression is performed.

22. The method of compressing motion image information according to one of claims 15 to 20, wherein when the block size changes towards a larger size, data in the block is output as it is without calculating difference from the data.

23. The method of compressing motion image information according to one of claims 15 to 20, wherein when the block size changes towards a larger size, difference from the previous expanded data in each portion is calculated and compressed in terms of the block size unit.

24. The method of compressing motion image information according to one of claims 1 to 23, further comprising using an intra-frame coded I frame (i.e., a reference frame solely from which an image can be reconstructed), spatially dividing said I frame into I blocks, and dispersing the I blocks between each frame along the temporal axis.

25. The method of compressing motion image information according to claim 24, wherein, said dispersing of the I blocks between each frame along the temporal axis is performed in such a manner that no I block is inserted in any block within the frame that has been updated due to difference between frames being greater than a given parameter (threshold) within a specific period of time.

26. The method of compressing motion image information, which pre-divides an image within a frame into blocks, approximating (substituting) each of all the divided blocks with a single plane represented by three pieces of data: intensity of a pixel within each block, the gradient of each block in the X direction, and the gradient of each block in the Y direction, using an intra-frame encoded I frame (i.e., a reference frame solely from which an image can be reconstructed), and inserting the I frame in a series of frames;

said method comprising spatially dividing said I frame into I blocks, and not inserting an I block in any block within the frame that has been updated due to difference between frames being greater than a given parameter (threshold) within a specific period of time when dispersing the I blocks between each frame along the temporal axis.

27. A method of compressing motion image information, which compares spatially adjacent pixels within a frame to each other to output difference information of pixel values; stores in a bit map, information regarding on whether or not the output difference information is greater than a given parameter (threshold), and compresses information stored in said bit map that is greater than said parameter (threshold), thereby reducing redundant information, said method comprising using an intra-frame coded I frame (i.e., a reference frame solely from which an image can reconstructed), spatially dividing said I frame into I blocks, and not inserting an I block in any block within the frame that has been updated due to difference between frames being greater than a given parameter (threshold) within a specific period of time when dispersing the I blocks between each frame along the temporal axis.

28. A system of compressing motion image information which comprises a bit map information recording means for comparing spatially adjacent pixels within a frame to each other or comparing temporally adjacent pixels between frames, outputting the resulting difference information for pixels, and storing in a bit map, information regarding on whether or not the output difference information is greater than a given parameter (threshold), and information compression means for compressing information stored in said bit map that is greater than said parameter (threshold), thereby reducing redundant information, said system comprising a block approximation means for dividing an image within a frame into blocks before an inter-frame compression procedure starts and approximating (substituting) each block divided with a single plane represented by at least three components for pixels within each block.

29. The system of compressing motion image information according to claim 28, wherein said information compression means processes (deletes) the information stored in the bit map that is greater than the parameter (threshold), as a changeless pixel.

30. The system of compressing motion image information according to either of claim 28 or 29, wherein said block approximation means utilizes an average or the method of least square for approximating so as to configure a single plane represented by at least three components for pixels.

31. The system of compressing motion image information according to one of claims 28 to 30, wherein in said block approximation means said plain is represented by three pieces of data: intensity of a pixel within a block, the gradient of intensities within the block in the X direction, and the gradient of intensities within the block in the Y direction.

32. The system of compressing motion image information according to one of claims 28 to 31, wherein the information stored by the bit map information recording means is compressed using at least one binary image coding method selected from the group consisting of run length coding, modified READ (MR, MMR) coding, modified Huffman (MH)coding, and JBIG coding.

33. The system of compressing motion image information according to one of claims 28 to 32, wherein said information compression means, which compresses the information greater than the parameter (threshold), performs the adaptive Huffman coding, which utilizes as many Huffman tables as the expected number of pieces of information.

34. The system of compressing motion image information according to one of claims 28 to 32, further comprising entropy coding means, which may reduce redundant information between frames; wherein this entropy coding means performs either the adaptive Huffman coding, which encodes utilizing a table selected from as many Huffman tables as an expected amount of pieces of information, or the adaptive arithmetic coding, which encodes utilizing a table selected from as many arithmetic tables as an expected amount of pieces of information.

35. The system of compressing motion image information according to one of claims 28 to 34, wherein the difference information stored by bit map information recording means is difference output through comparison of pixel t and pixel t−1 between said frames, where a block is configured by n×m pixels (n and m are integers of 2 or more) within a frame.

36. The system of compressing motion image information according to one of claims 28 to 35, wherein the intra-frame compression means performs the intra-frame compression in such a manner that the entire image is compressed in an n×m pixels block unit (n and m are integers, respectively) using a intra-frame compression method, compares pixels between the original image and the image expanded after compressed, outputs the resulting difference information for pixels, and if a pixel that caused a larger difference than the parameter (threshold) to occur exists, repeatedly using an ever smaller block size for a portion or a surrounding area including that pixel until a designated minimum block size is reached.

37. The system of compressing motion image information according to one of claims 28 to 36, wherein when there is no change in the block size as a result of the intra-frame compression performed by said block approximation means, inter-frame compression is performed.

38. The system of compressing motion image information according to one of claims 28 to 37, wherein, when the block size is changed into a larger one as a result of the intra-frame compression performed by the block approximation means, an additional calculation for difference of data within said block is not performed outputting as it is.

39. The system of compressing motion image information according to one of claims 28 to 37, wherein when the block size changes towards a larger size as a result of the intra-frame compression performed by said block approximation means, difference from the previous expanded data within each portion is calculated and compressed in terms of the block size unit.

40. The system of compressing motion image information according to one of claims 28 to 39, further comprising I block insertion means, which using an intra-frame coded I frame (i.e., a reference frame solely from which an image can be reconstructed), spatially dividing said I frame into I blocks, and dispersing the I blocks between each frame along the temporal axis.

41. The system of compressing motion image information according to claim 40, wherein, said I block insertion means does not insert an I block in any block within the frame that has been updated due to difference between frames being greater than the parameter (threshold) within a specific period of time.

42. A system of compressing motion image information, which comprises block approximation means, by which an image within a frame is pre-divided, and all of the pre-divided blocks are each approximated (substituted) with a single plane represented by intensity of a pixel in each block, the slope of intensities in each block in the X direction, and the slope of intensities in each block in the Y direction;

said system further comprising I block generation means for spatially dividing an intra-frame encoded I frame into I blocks, and I block insertion means for inserting an I block in a portion except for the block within the frame that has been updated due to difference between frames being greater than a given parameter (threshold) within a specific period of time when dispersing the I blocks between each frame along the temporal axis.

* * * * *